(12) United States Patent
Taha et al.

(10) Patent No.: US 7,746,866 B2
(45) Date of Patent: Jun. 29, 2010

(54) ORDERED AND DUPLICATE-FREE DELIVERY OF WIRELESS DATA FRAMES

(75) Inventors: Samer Taha, Beaverton, OR (US); Luiyang Lily Yang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 983 days.

(21) Appl. No.: 11/129,057

(22) Filed: May 13, 2005

(65) Prior Publication Data

US 2006/0256722 A1    Nov. 16, 2006

(51) Int. Cl.
*H04L 12/28* (2006.01)
(52) U.S. Cl. .................... 370/394; 370/406
(58) Field of Classification Search ............ 370/338, 370/349, 389, 328, 230, 235, 248, 475, 394, 370/406; 455/418, 502; 709/224, 236
See application file for complete search history.

(56) References Cited

U.S. PATENT DOCUMENTS

| | | | | |
|---|---|---|---|---|
| 5,648,970 | A * | 7/1997 | Kapoor | 370/394 |
| 5,978,364 | A | 11/1999 | Melnik | |
| 6,765,882 | B2 | 7/2004 | Rittle et al. | |
| 6,775,258 | B1 | 8/2004 | van Valkenburg et al. | |
| 7,061,913 | B1 * | 6/2006 | Abrol et al. | 370/394 |
| 7,161,909 | B2 * | 1/2007 | Sharma | 370/235 |
| 7,224,678 | B2 * | 5/2007 | Billhartz | 370/338 |
| 7,426,671 | B2 * | 9/2008 | Kimura | 714/748 |
| 2002/0075873 | A1 * | 6/2002 | Lindhorst-Ko et al. | 370/394 |
| 2004/0028016 | A1 * | 2/2004 | Billhartz | 370/338 |
| 2004/0032825 | A1 | 2/2004 | Halford et al. | |
| 2004/0114593 | A1 * | 6/2004 | Dick et al. | 370/389 |
| 2005/0223111 | A1 * | 10/2005 | Bhandaru et al. | 709/236 |
| 2005/0259587 | A1 * | 11/2005 | Wakumoto et al. | 370/248 |
| 2006/0034317 | A1 * | 2/2006 | Hong et al. | 370/445 |

(Continued)

FOREIGN PATENT DOCUMENTS

TW    0515176    12/2002

(Continued)

OTHER PUBLICATIONS

Johnson, D. B., et al., "Dynamic Source routing in Ad Hoc Wireless Networks", *Mobile Computing*, (1996).

(Continued)

*Primary Examiner*—Steven H Nguyen
*Assistant Examiner*—Awet Haile
(74) *Attorney, Agent, or Firm*—Scott M. Lane

(57) ABSTRACT

Methods and apparatus for delivering ordered and duplicate-free wireless data frames are generally described and claimed herein. Other embodiments may also be described herein. In an embodiment, a source address, a destination address, and a message sequence number are acquired from a wireless data frame. The message sequence number is compared against a last-received message sequence number and a last-delivered message sequence number. The destination address is also compared to a current address. In response to the compares, a decision is made to forward the wireless data frame to the destination address, discard the wireless frame as a duplicate wireless data frame, queue the wireless data frame, or release the wireless data frame to a next protocol layer.

7 Claims, 5 Drawing Sheets

U.S. PATENT DOCUMENTS

| | | | |
|---|---|---|---|
| 2006/0056457 A1* | 3/2006 | Livet et al. | 370/475 |
| 2006/0133272 A1* | 6/2006 | Yuan et al. | 370/230 |
| 2006/0168206 A1* | 7/2006 | Choong et al. | 709/224 |
| 2007/0058599 A1* | 3/2007 | Harsch | 370/338 |

FOREIGN PATENT DOCUMENTS

| | | |
|---|---|---|
| TW | 0515179 | 12/2002 |
| TW | 0563308 | 11/2003 |
| WO | WO-0219604 | 3/2002 |
| WO | WO-0219604 A3 | 3/2002 |
| WO | WO-2004015906 | 2/2004 |
| WO | WO-2004015906 A3 | 2/2004 |
| WO | WO-2006124260 A1 | 11/2006 |

OTHER PUBLICATIONS

95115055, "Taiwan Apllication No. 95115055, Office Action Mailed Dec. 2, 2008", 5 pgs.

* cited by examiner

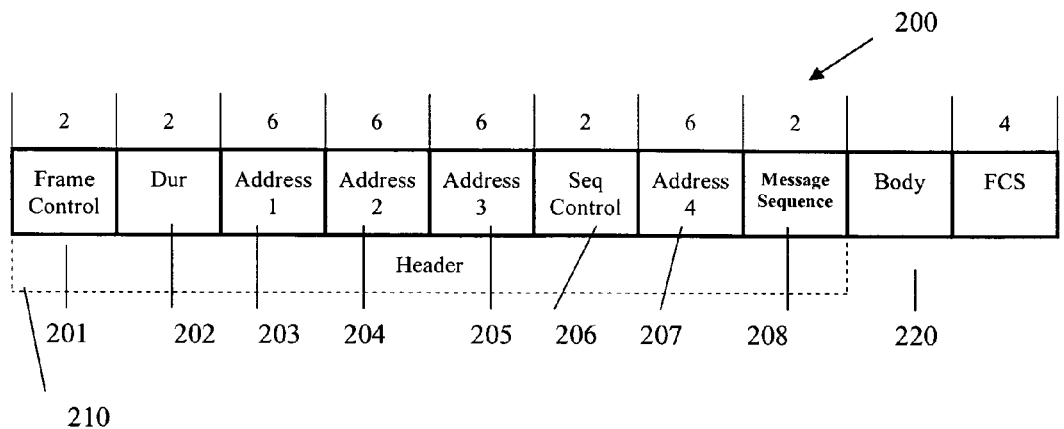

FIG. 2

| Source Address (SA) | Message Sequence of Last Received Data Frame (LRMSN) | Message Sequence of Last Data Frame Delivered (LDMSN) | Last Update Time |
|---|---|---|---|
| VALUE OF SOURCE ADDRESS (SA), ENTRY CREATED FOR EACH NEW SA | THE MESSAGE SEQUENCE NUMBER (MSN) OF THE LAST DATA FRAME RECEIVED (LRMSN) WHERE THE SA EQUALS THE VALUE IN THE FIRST COLUMN IN THIS TABLE. | THE MSN OF THE LAST DATA FRAME DELIVERED (LDMSN) TO HIGHER LAYER OR TO A CORRESPONDING ASSOCIATED LEGACY STATION (STA) WHERE THE SOURCE ADDRESS EQUALS THE VALUE IN THE FIRST COLUMN IN THIS TABLE. | LAST TIME THIS ENTRY IN THE TABLE WAS UPDATED. |

FIG. 3

ORDERED AND DUPLICATE-FREE DELIVERY OF WIRELESS DATA FRAMES

BACKGROUND INFORMATION

A wireless mesh network employs two or more processing points (Mesh Points (MP's)) where neighboring MP's communicate with each other directly over the air via a wireless communication mechanism. A wireless mesh network can be a wireless Personal Area Network (PAN), wireless Local Area Network (LAN), or wireless Wide Area Network (WAN). Each MP in a wireless mesh network may have more than one neighboring MP that it can directly communicate with and it is free to choose any of these neighboring MP's as a next hop to forward its traffic as part of the best suitable path to a given destination.

A wireless mesh network can be implemented at Layer 2 (data link layer) or Layer 3 (Internet Protocol (IP) Layer) of the network protocol stack. 802.11 wireless technologies have been used for communication among MP's and also used for routing and path selecting operations, which occur at Layer 2 of the protocol stack. This type of wireless mesh network is referred to as a Layer-2 wireless mesh network. Moreover, this arrangement implies that the wireless mesh network can have out-of-order and duplicate end-to-end delivery of Layer 2 data frames.

In a multi-hop wireless mesh network, out-of-order and duplicate frames result from the normal dynamics of the wireless network, including but not limited to: changed routing decisions for wireless data frames traversing the network. Furthermore, the rate of changed routing decisions can become more severe as the rate of topology changes, load level variations occur, and/or wireless channel fluctuations increase. As a result, the probability of out-of-order and duplicate frames can increase significantly.

However, a wireless mesh network implemented at Layer 2 is expected to provide duplicate free and in-order delivery of data frames for the next-higher layer (Layer 3) of the protocol stack. Layer 3 typically depends upon duplicate free and in-order data delivery for its normal operation.

BRIEF DESCRIPTION OF THE DRAWINGS

FIG. 2 is a diagram of an example wireless data frame, according to an example embodiment.

FIG. 3 is a diagram of an example control data structure processed within a wireless mesh network, according to an example embodiment.

DESCRIPTION OF EMBODIMENTS

Figure 1:
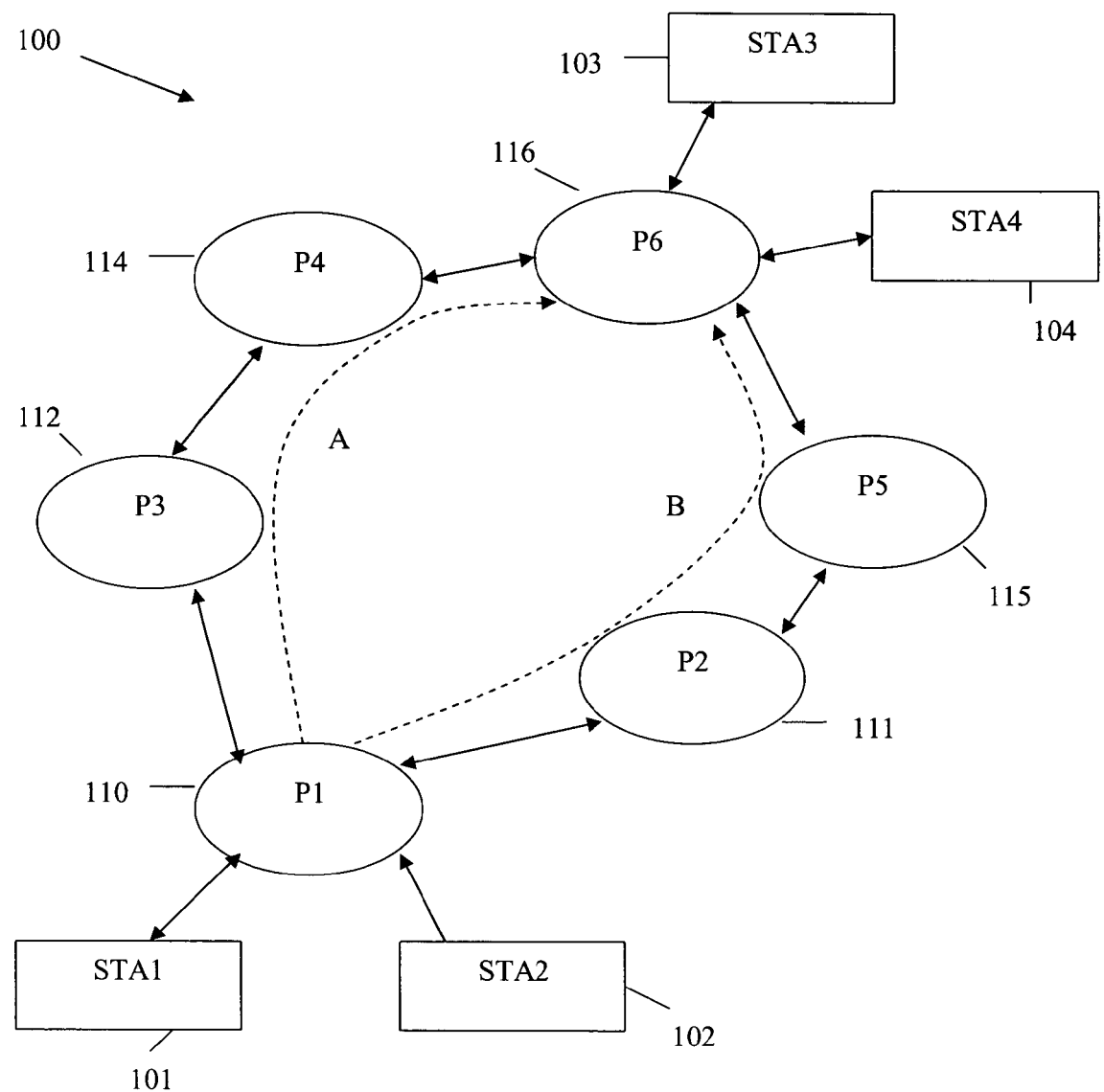
FIG. 1 is a diagram of an example wireless mesh network, according to an example embodiment of the invention.

FIG. 1 is a diagram of an example wireless mesh network 100, according to an example embodiment of the invention. The wireless mesh network 100 is implemented as software or firmware instructions processing within a combination of wireless processing nodes (Mesh Points (MP's)) and/or other processing devices, referred to as stations (STA).

It is noted, that the arrangement depicted in FIG. 1 is presented for purposes of illustration only and that other configurations are possible for a wireless mesh network 100 without departing from the teachings presented herein.

In the example wireless mesh network 100, a variety of client or user devise are depicted as STA1 101, STA2 102, STA3 103, and STA4 104. STA1 101 and STA2 102 originate a wireless network transmission having a plurality of wireless data frames that are transmitted over the wireless mesh network 100 through MP's 110-116 to destination STA's 103 and 104.

In the example, P1 110 is an originating node within the wireless mesh network 100 for STA1 101 and STA2 102. The arrows labeled A and B represents paths that the wireless data frames may take in reaching their destination P2 116. Path A shows that frames may travel through MP's P1 110-P3 112-P4 114-P6 116. However, Path B shows that the same frames may also travel through MP's P1 110-P2 111-P5 115-P6 116. Thus, the order of frames traversing to P6 116 can fluctuate over the two paths A and B leading to out-of-order delivery of frames. Moreover, P6 116 is likely to receive duplicate frames that traverse both paths A and B.

To ensure that P6 116 provides ordered and duplicate-free delivery of data frames to the next highest layer of the protocol stack and to the destination stations STA3 103 and STA4 104, P6 116 implements the techniques presented herein and below. In fact, each MP 110-116 implement the techniques presented herein and below. To facilitate the techniques presented herein a modification is made to a wireless data frames header, depicted in FIG. 2; and a control data structure is managed by each of the MP's 110-116, depicted in FIG. 3.

FIG. 2 is a diagram of an example wireless data frame 200, according to an example embodiment. The wireless data frame 200 is implemented in machine-accessible and readable media as the frame 200 traverse a wireless mesh network, such as the wireless mesh network 100 depicted in FIG. 1.

A wireless data frame 200 includes a header 210 and a body 220. The header 210 and body 220 combine to form a wireless data packet. The header 210 includes information (e.g., metadata) about the packet body 220; and the packet body 220 includes the actual data being carried with a wireless data packet.

As an example of frame information, consider the 802.11 media access control (MAC) frame that may include: a frame control number 201; addresses 203-205 and 207 associated with specific nodes of the network, such as destination nodes; a sequence control number 206, and other meta-information 202. It is noted that a MAC's sequence control number 206 is often modified by each node that processes a frame along its route to a destination. Correspondingly, this field does not adequately provide a mechanism for determining an order or sequence of a MAC frames. It is also noted that the addresses 203-205 and 207 may be consumed by a MP for purposes of acquiring a routing table to acquire the path of the wireless data frame 200 to traverse through the network to its destination.

With embodiments presented herein, the wireless data frame 200 includes an additional field within the frame referred to as a message sequence number (MSN) 208. The MSN 208 is uniquely evaluated and manipulated by wireless network nodes (MP's) for purposes of delivering wireless data frames 200 and their associated data to a next protocol layer in an ordered and duplicate-free manner. The technique for using the MSN with respect to the processing of a wireless data frame 200 is discussed below with FIG. 4. That processing inspects the MSN 208 of wireless mesh data frames 200 and evaluates it with respect to a control data structure.

FIG. 3 is a diagram of an example control data structure 300 processed within a wireless mesh network, according to an example embodiment. The control data structure 300 is implemented in a machine-accessible and readable medium and is maintained and managed by each processing node (MP).

The control data structure 300 includes a table entry for each unique source address (SA). Each entry includes a value for a SA 301; a MSN for a last-received and processed MSN, referred to as LRMSN 302; a MSN for a last-delivered and processed MSN, referred to as LDMSN 303; and optionally a last updated time value 304.

A MP maintains the control data structure 300 by modifying entries and evaluating entries in response to received wireless data frames. The LRMSN 301 identifies for a particular SA 301 a frame that the MP last received from that SA 301. The LDMSN 302 identifies for a particular SA 301 a frame that the MP last delivered to a station or next-higher layer of a protocol stack for that SA 301. The update time value 304 let's the MP know when it last took some action with respect to frames being processed for a given SA 301. The techniques for modifying and evaluating the control data structure 300 with respect to the MSN of the wireless data frames 200 will now be described in the descriptions of the FIGS. 4-7 that follow.

Figure 4:
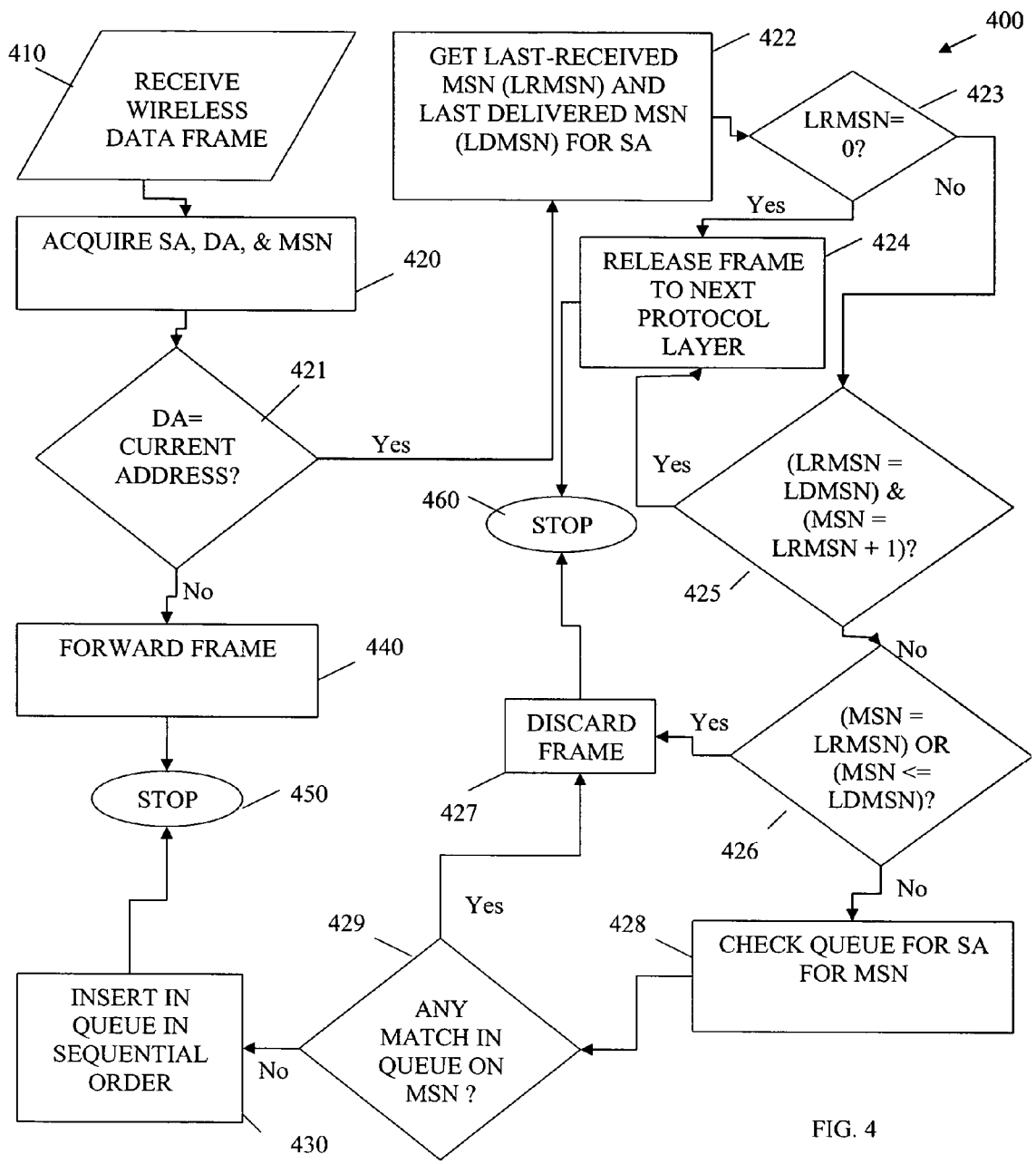
FIG. 4 is a diagram of a method to deliver an ordered and duplicate-free wireless data frame, according to an example embodiment.

FIG. 4 is a diagram of a method 400 to deliver an ordered and duplicate-free wireless data frame, according to an example embodiment. The method 400 (hereinafter "wireless data frame processing service") is implemented in a machine-accessible and readable medium. The wireless data frame processing service processes at the data link layer (Layer 2) of a wireless mesh network protocol stack.

In an embodiment, the wireless data frame processing service is implemented as software and/or firmware within a node of a wireless mesh network; the node may be a client, a server, a router, a switch, a bridge, a hub, or any other wireless device capable of receiving and/or transmitting wireless data.

The wireless data frame processing service represents the processing of one wireless node (MP) within a wireless network and the actions that it may take in response to receiving a wireless data frame from a source address. Examples of MP were provided above with respect to the description of FIG. 1. The source address may also be considered another processing instance of the wireless data frame processing service. The wireless data frame's destination addresses provide the mechanism for the MP to acquire a routing table for the wireless data frame. The routing table includes a path or route of addresses defining wireless data frame's planned movement through the network. The path identifies an originating source address, zero or more intermediate source addresses, and a destination address. A source address, an intermediate address, and a destination address may be considered processing nodes identifiers where each node may perform the processing of the wireless data frame processing service.

At 410, the wireless data frame processing service receives a wireless data frame. At 420, the source address (SA), destination address (DA), and message sequence number (MSN) are acquired from the wireless data frame. Initially, at 421, a check is made to determine if the DA equals a current address associated with the processing node on which the wireless data frame processing service is executing. This indicates that the destination for the received wireless data frame is the node or local environment of the wireless data frame processing service.

Assuming, the DA is equal to the current address of the wireless data frame processing service, then, at 422, a variety of control data is acquired by the wireless data frame processing service. The control data is maintained by the wireless data frame processing service to ensure the ordered and duplicate-free delivery of received wireless data frames. In an embodiment, the control data is represented as a table data structure indexed by SA's. The table includes an instance of the control data for each unique SA.

The control data includes a value for a SA, a last-received MSN (LRMSN), a last-delivered MSN (LDMSN), and optionally a time stamp. The LRMSN identifies a previous MSN associated with the last wireless data frame received from a particular SA. The LDMSN identifies a MSN of a last-delivered wireless data frame, which was delivered to a next and higher layer within the protocol stack for the node of the wireless data frame processing service. The optional time stamp indicates when a wireless data frame was last received or delivered from the node of the wireless data frame processing service.

Once the control data is acquired, it can be compared for purposes of processing the received wireless data frame. Accordingly, at 423, a check is made to determine if the LRMSN is equal to zero. If this evaluation is true, then the received wireless data frame is a first frame being received by the wireless data frame processing service from the SA associated with the wireless data frame. Thus, at 424, if the LRMSN was zero, then the wireless data frame may be released to the next protocol layer within the node of the wireless data frame processing service.

However, if the LRMSN is not zero, at 423, then one or more additional comparisons may be processed. Correspondingly, at 425, a check is made to see if the LRMSN is equal to the LDMSN and to see if the MSN associated with the received wireless data frame is equal to the sum of the LRMSN plus one. If this evaluation is true, then it is an indication that the wireless data frame processing service, in its last and most recent action, released a wireless data frame to the next protocol layer that sequentially preceded the current received wireless data frame. So, if this is true, the current received wireless data frame can be released, at 424, to the next protocol layer on the node of the wireless data frame processing service. Once the wireless data frame is released to the next protocol layer, processing for this wireless data frame concludes or stops, at 460. It is noted, that the processing may idle at 460 and pick up again at 410 as soon as another wireless data frame is received.

If the evaluation, at 425, was false, then an additional evaluation is performed, at 426. At 426, a check is made to determine whether the MSN of the currently received wireless data frame is either equal to the LRMSN or is less than or equal to the LDMSN. If this evaluation is true, then it indicates that the current received wireless data frame is a duplicate, which the wireless data frame processing service has previously processed. Accordingly, if the evaluation, at 426, is true, then, at 427, the received wireless frame may be discarded or ignored by the wireless data frame processing service. If the wireless data frame is discarded, then processing for the frame stops or concludes, at 460. Again, processing may pick up at 410 after a stop occurs to detect when another wireless data frame is received.

If the evaluation, at 426, was false, then additional checks may be pursued. To facilitate these additional checks, the wireless data frame processing service may maintain a processing queue for each unique SA. Thus, at 428, the wireless data frame processing service acquires the processing queue associated with the SA of the currently received wireless data frame. At 429, a check is made to determine if the MSN of the currently received wireless data frame is equal to any MSN's which reside in the SA's processing queue. If this is true, then this is another indication that the currently received wireless data frame is a duplicate and it may be discarded, at 427, and processing for the frame can conclude or stop, at 460; processing resumes at 410 when another wireless data frame is received.

However, if the evaluation, at 429, is false, then this is an indication that the currently received wireless data frame is not a duplicate and is not yet ready to be released on the node of the wireless data frame processing service to the next protocol layer. Thus, at 430, in a situation such as this, the currently received wireless data frame is inserted into the proper SA queue in sequential order with respect to the other MSN's that populate that queue. Once inserted into the queue, the processing for the currently received wireless data frame may stop, at 450; processing resumes from 450 at 410 for purposes of detecting another received wireless data frame.

The above-described processing was presented within the context that the received wireless data frame included a DA which matched the current address of the node, which is executing the wireless data frame processing service. This check was performed at 421 before the subsequent processing was described. However, if the DA of the wireless data frame does not equal the current address, at 421, then, at 440, the received wireless data frame may be forwarded to a next processing node identified in the routing table associated with the frame's planned route or path.

In some cases, the next processing node may be the destination node of the wireless data frame. In other cases, the next processing node may be still another intermediate processing node. Thus, if the evaluation at 421 is false the wireless data frame processing service is an intermediate node within the route or path of the wireless data frame. In cases where the wireless data frame processing service is an intermediate node, the wireless data frame processing service does not modify the MSN of the currently received wireless data frame; the wireless data frame processing service forwards, at 440, the wireless data frame along unmodified to a next node identified as an address in the wireless data frame and, at 450, processing for the wireless data frame stops or concludes; processing may resume at 410 to detect another received wireless data frame.

In an embodiment, additional processing may be performed by the wireless data frame processing service for purposes of managing queues associated with undelivered wireless data frames. The queue may be any type of buffer any type or data structure (e.g., list, table, etc.), which is managed by the wireless data frame processing service. One useful management operation may include, using a time stamp included in the control data to identify stale entries in the queue; and purging the queue for a given SA after a predefined or threshold amount of elapsed time expires without having received a new wireless data frames for the given SA. When items are purged from the queue, they may be optionally released to the next protocol layer of the node executing the wireless data frame processing service; however, out-of-sequence frames in the queue are not released to the next protocol layer.

For example, the wireless data frame processing service may monitor each of its SA queues if these queues are non empty, which implies that some data frames have not been released to the next protocol layer for a given network transaction. The fact that a particular queue is non empty also implies that some data frames were received out-of-order for the given transaction. In cases such as this, the wireless data frame processing service may idle or wait for a configurable amount of time in the hope that a SA will send the missing data frame. The wireless data frame processing service knows to wait as long as the MSN of the first data frame in the queue minus the LDMSN is greater than 1, which indicates the queue is missing a data frame; and the wireless data frame processing service knows to wait as long as current time minus the time stamp value in the control data associated with the given SA is not greater than the predefined and configurable threshold wait time. If either of these conditions is not met, then the wireless data frame processing service knows to deliver frames from the queue as long as frames are not delivered out-of-order. It should be noted that some frames may be lost and so an example stream of frames #1, #2, and #4 is not considered out-of-order; but a stream of frames #1, #3, and #2 is considered to be out-of-order. Out-of-order frames are purged from the queue and any subsequent received frames are ignored by the wireless data frame processing service.

Figure 5:
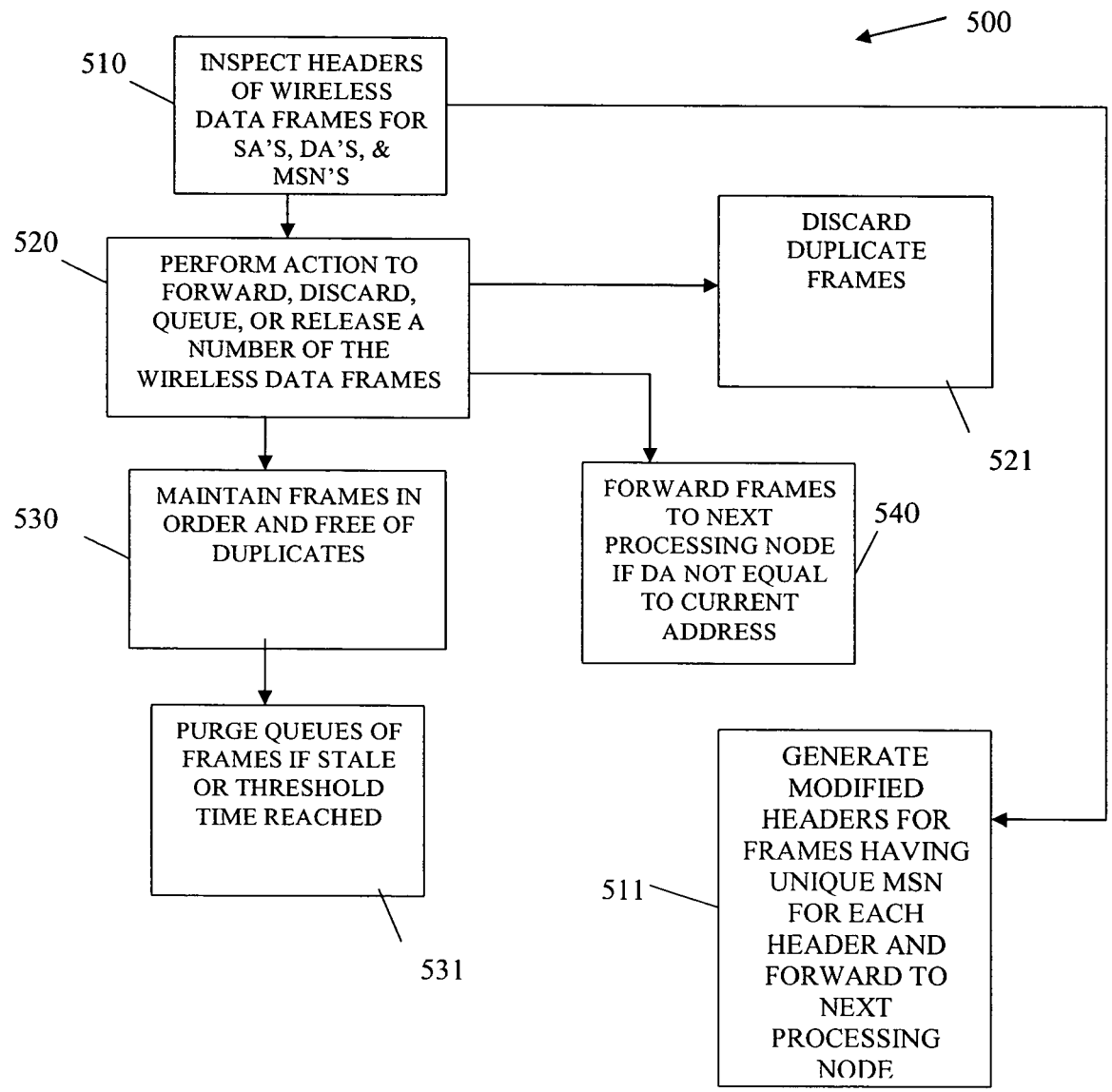
FIG. 5 is a diagram of a method to manage the ordered and duplicate-free delivery of wireless data frames, according to an example embodiment.

FIG. 5 is a diagram of a method 500 to manage the ordered and duplicate-free delivery of wireless data frames, according to an example embodiment. The method 500 is implemented as instructions within a machine-accessible and readable medium and is operational over a wireless network. The instructions operate at the data link layer (Layer 2) of the network protocol stack and are operational for wireless mesh networks.

The instructions may reside on removable media that is interfaced to a machine where the instructions are uploaded and processed to perform the method 400 depicted in FIG. 4. Alternatively, the instructions may be prefabricated within memory and/or storage of a machine. In still other arrangements, the instructions may be downloaded from one machine on the network to another machine where they are processed.

At 510, the instructions inspect headers associated with wireless data frames for purposes of extracting SA's, DA's, and MSN's associated with the wireless data frames. In some cases, at 511, the instructions may be executing on a node where wireless data is originating from. Accordingly, in these cases, the instructions generate modified headers for the new wireless data frames associated with the wireless data, such that each frame includes a unique and sequential MSN. To achieve this, the instructions may maintain a local counter for purposes of supplying a unique and sequential MSN to each frame associated with wireless data originating on the node of the instructions.

Thus, it is noted that the instructions may be used to process original wireless data frames as an originating node; may be used to process received wireless data frames as an intermediate node; and may be used to process received wireless data frames as a destination node of the wireless data frames.

In cases where the instructions are operating as an intermediate node or a destination node the processing of 520-540 is performed in the following manner. At 520, an action is performed by the instructions on a received wireless data frame in response to the SA, DA, and MSN associated with the received wireless data frame. These actions may include forwarding the frame unchanged to a next processing node, discarding the frame, queuing the frame in a queue or buffer associated with the SA, or releasing the frame to a next protocol layer associated with the node on which the instructions are processing. The techniques for deciding these actions were provided above with respect to the description of the method 400 of FIG. 4.

For example, at 521, the instructions may detect a number of the wireless frames being processed as duplicates of previously processed frames. In other words, the MSN for a given frame being processed may have already been received, may have already been released to the next protocol layer, or may already be queued for release at a later point in time.

At 530, frames that are released to the next protocol layer are maintained in sequential order and free of duplication by the instructions until they are released to the next protocol layer. Moreover, the frames designated for release are released in sequential order to the next protocol layer in response to the MSN's associated with the frames and an identified LDMSN.

In an embodiment, at 531, a variety of heuristics may be implemented to purge queues associated with SA's, such that frames in the queue are removed or delivered when it is desirable to do so. Sample techniques for performing this type of management of queues were provided above with respect to the discussion of the method 400 of FIG. 4.

In some cases, at 540, where the instructions are acting on a frame as an intermediate node for that frame, the instructions forward any such frame along to a next processing node in the route or path of the frame. The MSN's are not modified or altered in any manner by the instructions when the instructions are acting as an intermediate processing node on behalf of a given frame. This ensures that a final DA associated with the frame can rely on and process the frame in an ordered and duplicate-free manner by using that frame's MSN.

Figure 6:
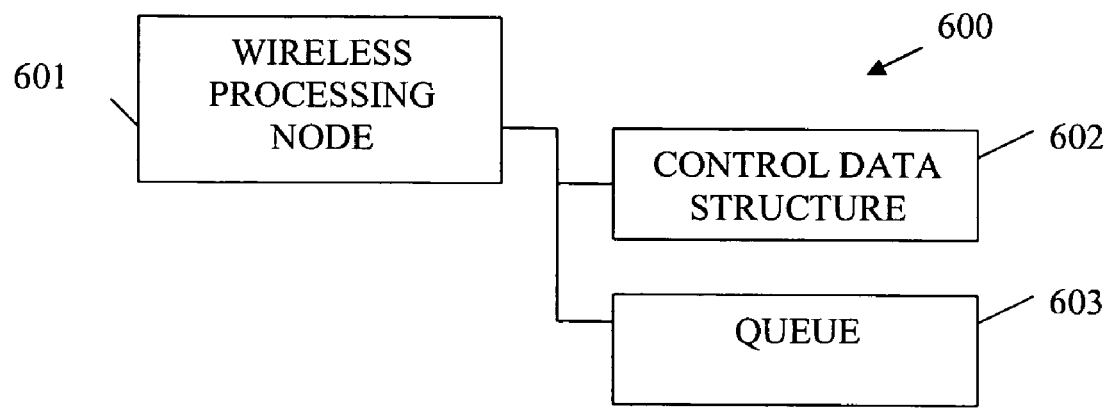
FIG. 6 is a diagram of a wireless data frame processing apparatus, according to an example embodiment.

FIG. 6 is a diagram of a wireless data frame processing apparatus 600, according to an example embodiment. The wireless data frame processing apparatus 600 is implemented in a machine-accessible and readable medium. In an embodiment, the wireless data frame processing apparatus 600 implements the methods 400 and 500 of FIGS. 4 and 5.

The wireless data frame processing apparatus 600 includes a wireless processing node 601 and a control data structure 602. In an embodiment, the wireless data frame processing apparatus 600 may also include one or more processing queues 603. Each of these will now be discussed in turn.

The wireless processing node 601 includes instructions for generating new wireless data frames for wireless data that originates within the environment of the wireless data frame processing apparatus 600. Additionally, the wireless processing node 601 includes instructions for acting as an intermediate node for received wireless data frames. Still further, the wireless processing node 601 includes instructions for acting as destination node for received wireless data frames.

In cases where the wireless processing node 601 is generating wireless data frames, the wireless processing node 601 includes a counter or other mechanism for uniquely and serially assigning MSN's to each wireless data frame being generated on the wireless processing node 601.

The wireless processing node 601 makes a determination to act as an intermediate node on behalf of a given wireless data frame when the DA for the frame is not equal to the current address of the wireless processing node 601. When acting under this particular role, the wireless processing node 601 does not alter the MSN in the header of the wireless data frame; and the frame is forwarded to a next processing node associated with the route or path of that frame.

The wireless processing node 601 knows to act as a destination node when the DA of a given wireless data frame is equal to the current address of the wireless processing node 601. Here, the wireless processing node 601 can take any of the following actions in response to the MSN carried in the header of the wireless data frame: release the frame to a next protocol layer within the environment of the wireless processing node 601, queue the frame in a queue 603 associated with the SA of the frame, or discard the frame entirely as a duplicate of a previously received frame.

The wireless processing node 601 utilizes a control data structure 602 to make a proper decision with a given wireless data frame when the wireless processing node 601 is acting as a destination node for that received frame. The control data structure 602 records previous actions taken by the wireless processing node. Each entry within the control data structure 602 corresponds to a particular SA. Thus, the wireless processing node 601 may concurrently manage and concurrently handle transactions from a variety of different SA's.

In an embodiment, the control data structure 602 includes a field or entry for each SA that identifies a particular SA, identifies a LRMSN, identifies a LDMSN, and identifies a time stamp when a last action was taken by the wireless processing node 602. The LRMSN and LDMSN may be used to compare against the MSN of the current wireless data frame for purposes of deciding which action to take with respect to that frame. The logic for performing these comparisons was described in detail above with respect to the method 400 of FIG. 4. The time stamp may be used to further manage any optional queues 603 associated with the wireless data frame processing apparatus 600.

Each queue 603 includes undelivered frames, which are maintained in sequential MSN order within the queue 603. Furthermore, each queue 603 is associated with a particular SA. Frames are stored in the queue 603 as a temporary holding space, if the wireless processing node determines that such frames are not yet properly deliverable to the next protocol layer. This occurs when frames are received out-of-order. Frames may be purged from the queue 603 based on a variety of heuristics. Some examples of this were provided above with respect to the description of the method 500 and FIG. 5.

Figure 7:
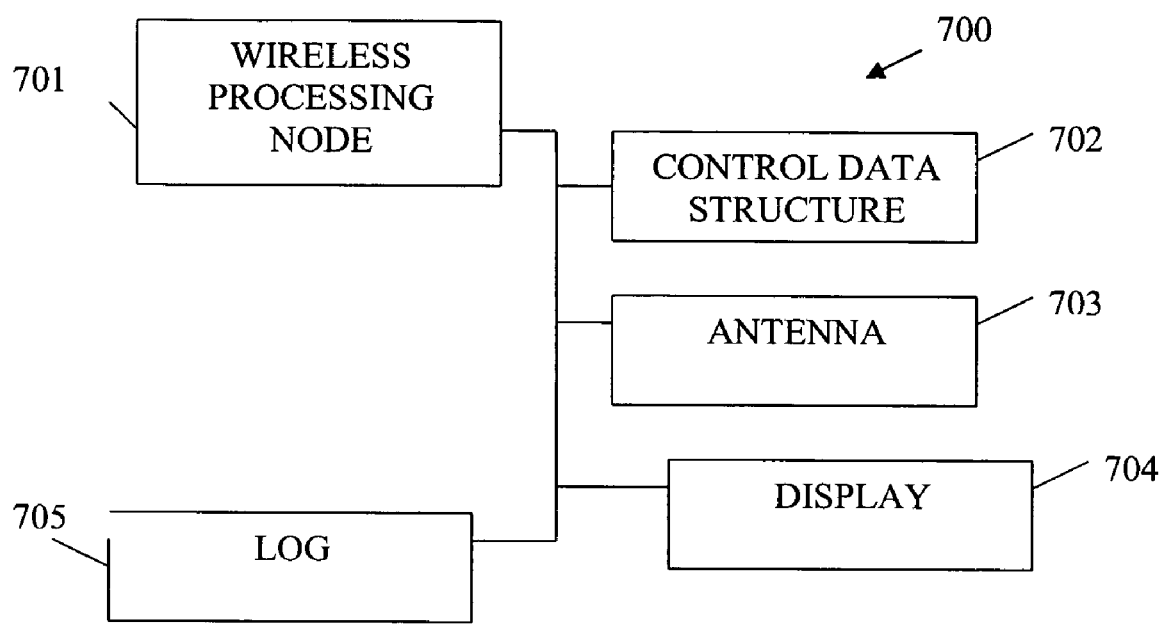
FIG. 7 is a diagram of a wireless data frame processing system, according to an example embodiment.

FIG. 7 is a diagram of a wireless data frame processing system 700, according to an example embodiment. The wireless data frame processing system 700 is implemented in a machine-accessible and readable medium. The wireless data frame processing system 700 includes the wireless data frame apparatus 600 of FIG. 6 and includes some other additional components.

The wireless data frame processing system 700 includes a wireless processing node 401, a control data structure 702, and an omni-directional antenna 703. Optionally, the wireless data frame processing system 700 may also include a display 704 and/or a log 705.

The wireless processing node 701 and control data structure 702 operate in the manner described above for the wireless data frame apparatus 600 of FIG. 6. The omni-directional antenna 703 is interfaced to the wireless processing node 701 and is used by the wireless processing node to detect wireless data frames and to transmit wireless data frames. In an embodiment, the omni-directional antenna 703 and the wireless processing node 701 are implemented and configured to detect and transmit 802.11 compliant wireless data. For example, the omni-directional antenna 703 and the wireless processing node 401 may be configured to intercept and transmit 802.11 wireless mesh network data frames. The omni-directional antenna 703 may be a patch antenna, a dipole antenna, a unidirectional antenna, an infra-red transmitter, an infra-red receiver, photo-emitters and receptors, and/or charge-coupled devices, among others.

In an embodiment, the wireless data frame processing system 700 also includes a display 704. The display is interfaced to the wireless processing node 701 and presents information designed to monitor or track a current state of the control data structure 702 and/or activity associated with the wireless processing node 701.

In yet another embodiment, the wireless data frame processing system 700 may include a log 705. The log resides in memory or storage accessible to the wireless processing node 701 and is designed to record states associated with the control data structure 702 and activity occurring with the wireless processing node 701.

Although the embodiments may have been discussed in the context of an 802.11x implementation (e.g., 802.11a, 802.11g, 802.11 HT, etc.), the claims are not so limited. Indeed, embodiments of the invention may well be implemented as part of any wireless system, including those using multi-carrier wireless communication channels (e.g., orthogonal frequency-division multiplexing (OFDM), discrete multi-tone modulation (DMT), etc.), such as may be used within, without limitation, a wireless personal area network (WPAN), a wireless local area network (WLAN), a wireless metropolitan area network (WMAN), a wireless wide area network (WWAN), a cellular network, a third generation (3G) network, a fourth generation (4G) network, a universal mobile telephone system (UMTS), and the like communication systems.

Implementing the apparatus, systems, and methods described herein may result in improved management of frequency spectrum use, especially when legacy channels are overlapped by wide bandwidth channels. Improved network throughput may be derived there from.

The above description is illustrative, and not restrictive. Many other embodiments will be apparent to those of skill in the art upon reviewing the above description. The scope of embodiments of the invention should therefore be determined with reference to the appended claims, along with the full scope of equivalents to which such claims are entitled.

The Abstract is provided to comply with 37 C.F.R. §1.72(b) in order to allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting an intention that the claimed embodiments of the invention have more features than are expressly recited in each claim. Rather, as the following claims reflect, inventive subject matter may lie in less than all features of a single disclosed embodiment. Thus the following claims are hereby incorporated into the Description of the Embodiments, with each claim standing on its own as a separate exemplary embodiment.

What is claimed is:

1. A method implemented in a non transitory machine-readable medium and processed by a processing node of a network, the method comprising:
    acquiring, at a data link layer of a wireless mesh network protocol stack, a source address, a destination address, and a message sequence number from a sequence number field of a media access control header of a wireless data frame, wherein the sequence number field is separate from a sequence control field in the media access control (MAC) header;
    comparing, at the data link layer of the wireless mesh network protocol stack, a last-received message sequence number for the source address against the message sequence number and comparing the destination address to a current address;
    maintaining a separate queue for each source address and deciding that there are no additional frames to forward to a particular processing node when a particular queue is empty and further deciding that the additional frames when present in the particular queue are to be purged from that particular queue when a number of the additional frames are sequentially out of order within the particular queue; and
    deciding, at the data link layer of the wireless mesh network protocol stack and in response to the compares, whether to perform at least one of:
        forwarding the wireless data frame to a next processing node;
        discarding the wireless data frame;
        queuing the wireless data frame; or
        releasing the wireless data frame to a next protocol layer.

2. The method of claim 1, wherein deciding further includes performing the forwarding of the wireless data frame to the next processing node if the destination address does not equal the current address.

3. The method of claim 1, wherein deciding further includes performing the discarding of the wireless data frame if the destination address equals the current address and if at least one of:
    the message sequence number is equal to the last-received message sequence number;
    the message sequence number is equal to an entry message sequence number in a queue associated with the source address; or
    the message sequence number is equal to or less than a last-delivered message sequence number.

4. The method of claim 1, wherein deciding further includes performing the queuing of the wireless data frame if the destination address equals the current address and if:
    the message sequence number is greater than a last-delivered message sequence number; and
    the message sequence number is not equal to an entry message sequence number in a queue associated with the source address.

5. The method of claim 1, wherein deciding further includes performing the releasing of the wireless data frame to the next protocol layer if the destination address equals the current address and if at least one of:
    the last-received message sequence number is equal to zero; and
    the last-received message sequence number equals a last-delivered message sequence number, and the message sequence number is equal to the last-received message sequence number plus one.

6. The method of claim 1 further comprising:
    periodically inspecting queue entry message sequence number's associated with a queue of the source address, if the queue includes at least one queue entry, wherein each queue entry message sequence number is removed from the queue once released to the next protocol layer; and
    purging the queue of remaining ones of the queue entry message sequence number's after a threshold amount of elapsed time is reached.

7. The method of claim 6 further comprising, maintaining each queue entry message sequence number in a sequential order within the queue relative to one another while each queue entry message sequence number resides in the queue.

* * * * *